(12) United States Patent
Komiyama et al.

(10) Patent No.: US 9,201,177 B2
(45) Date of Patent: Dec. 1, 2015

(54) SAFETY CONFIRMATION MIRROR

(75) Inventors: Sakae Komiyama, Kawaguchi (JP);
Hiroshi Nishiyama, Kawaguchi (JP);
Katsumi Machida, Kawaguchi (JP);
Hisanaga Takeda, Kawaguchi (JP);
Yoshiyuki Iwata, Kawaguchi (JP)

(73) Assignee: KOMY CO., LTD., Kawaguchi-shi (JP)

( * ) Notice: Subject to any disclaimer, the term of this patent is extended or adjusted under 35 U.S.C. 154(b) by 228 days.

(21) Appl. No.: 13/877,723

(22) PCT Filed: Oct. 13, 2011

(86) PCT No.: PCT/JP2011/073564
§ 371 (c)(1),
(2), (4) Date: Apr. 4, 2013

(87) PCT Pub. No.: WO2012/053422
PCT Pub. Date: Apr. 26, 2012

(65) Prior Publication Data
US 2013/0194686 A1    Aug. 1, 2013

(30) Foreign Application Priority Data

Oct. 20, 2010 (JP) ................................ 2010-235778

(51) Int. Cl.
*G02B 5/09* (2006.01)
*G02B 5/18* (2006.01)
(52) U.S. Cl.
CPC ............... *G02B 5/09* (2013.01); *G02B 5/1861* (2013.01); *G02B 5/1876* (2013.01)
(58) Field of Classification Search
CPC ...... G02B 5/09; G02B 5/1861; G02B 5/1876; G02B 5/08

USPC .......................... 359/844, 850, 851, 861, 868
See application file for complete search history.

(56) References Cited

U.S. PATENT DOCUMENTS

| | | | | |
|---|---|---|---|---|
| 3,708,222 A * | 1/1973 | Stern | ............................. | 359/851 |
| 5,847,889 A * | 12/1998 | Komiyama | .............. | G02B 5/10 |
| | | | | 359/850 |
| 2007/0058257 A1 * | 3/2007 | Lynam | ................. | B60Q 1/2665 |
| | | | | 359/604 |

FOREIGN PATENT DOCUMENTS

JP         2002-235306       8/2002

OTHER PUBLICATIONS

International Search Report issued in PCT/JP2011/073564, dated Dec. 13, 2011.

*Primary Examiner* — Stephone B Allen
*Assistant Examiner* — Rahman Abdur
(74) *Attorney, Agent, or Firm* — Greer Burns & Crain Ltd.

(57) ABSTRACT

Provided is a safety confirmation mirror whereby a blind spot near a corner of a passageway can be easily seen more clearly. The safety confirmation mirror includes, as a reflective surface (2), a portion of a Fresnel mirror (3) offset to one side of the widthwise center (C1). Accordingly, when the safety confirmation mirror is installed on a wall surface of a passageway at a T-shaped, L-shaped, or cross intersection, the reflective surface 2 reflects the blind spot of a passageway in one direction that a person is going to turn, and the person can see the conditions thereof. Moreover, the reflective surface 2 does not reflect the conditions in the unnecessary direction. Accordingly, the person looking at the safety confirmation mirror (1) is not confused by the unnecessary image and can easily see the blind spot near the corner of the passageway more clearly.

5 Claims, 11 Drawing Sheets

SAFETY CONFIRMATION MIRROR

This application is a U.S. National Phase under 35 U.S.C. §371 of International Application No. PCT/JP2011/073564, filed Oct. 13, 2011.

TECHNICAL FIELD

The present invention relates to a safety confirmation mirror and more specifically relates to a safety confirmation mirror whereby a blind spot near a corner of a passageway can be easily seen more clearly.

BACKGROUND ART

A conventionally-known Fresnel mirror includes a transparent planar plastic plate with a large number of annular inclined grooves concentrically formed in the back surface thereof, and a reflective film laid on the inclined grooves (see Patent Document 1, for example). The angle of inclination of the inclined grooves gradually increases as the distance of the inclined grooves from the concentric center in the radial direction increases. The Fresnel mirror can be made thin compared to conventional convex mirrors. Accordingly, even when a Fresnel mirror is placed on a wall surface of a passageway at an intersection such as a T-shaped, L-shaped, or cross intersection for confirmation of a blind spot near a corner of the passageway, the thin Fresnel mirror is not seen as an obstacle.

For example, in order to confirm the blind spot at a T-shaped intersection, a Fresnel mirror 3 is installed on a far end wall surface W1 at the end of a passageway P1 as illustrated in FIG. 11. When the Fresnel mirror 3 is installed in this manner, a person H1 who is moving straight along the passageway P1, which ends at the far end wall surface W1, looks at the Fresnel mirror 3 and can see the conditions of a blind spot S1 in the direction that the person H1 is going to turn at the corner. The person H1 can therefore avoid collision with a person H2, an object, or the like moving from the blind spot S1.

However, the Fresnel mirror 3 also reflects the conditions of a spot S2 in the direction that the person H1 is not going to turn. The person H1 who is going to turn left can visually know a person, an object, or the like moving from the spot S2 side without the Fresnel mirror 3 as long as the passageway P1 that the person H1 is moving along has a certain width. If the condition of the spot S2 in the direction that the person H1 is not going to turn is reflected on the Fresnel mirror 3, the person H1 may be sometimes confused by the reflected image. For example, in some cases, the person H1 does not know whether the image reflected on the Fresnel mirror 3 shows the conditions in the direction that the person H1 is going to turn or the conditions in the direction that the person H1 is not going to turn.

If such an unnecessary image is reflected on the Fresnel mirror 3, the person H1 looking at the Fresnel mirror 3 is confused and cannot clearly see the blind spot S1 in the necessary direction in some cases. The same problem occurs also in the case of the Fresnel mirror 3 is installed on a wall surface of a passageway at an L-shaped or cross intersection.

Moreover, in the case of using a single and entire Fresnel mirror 3, the Fresnel mirror 3 needs to be installed at a position of a widthwise center C2 of the passageway P1 ending at the far end wall surface W1 in order to reflect blind spots on both right and left sides in a passageway P2 extending to the right and left at the T-shaped junction. This makes smaller the blind spots on the both right and left of the passageway P2 which can be seen through the Fresnel mirror 3.

PRIOR ART DOCUMENT

Patent Document

Patent Document 1: Japanese patent laid-open publication No. 6-174906

SUMMARY OF THE INVENTION

Problem to be Solved by the Invention

An object of the present invention is to provide a safety confirmation mirror whereby a blind spot near a corner of a passageway can be easily seen more clearly.

Means for Solving the Problem

To achieve the aforementioned object, a safety confirmation mirror of the present invention includes, as a reflective surface, a portion of a Fresnel mirror being offset to one side of the widthwise center of the Fresnel mirror.

Effects of the Invention

The safety confirmation mirror of the present invention includes, as a reflective surface, a portion of a Fresnel mirror being offset to one side of the widthwise center of the Fresnel mirror. Accordingly, the reflective surface reflects a blind spot of a passageway in one direction that a person is going to turn, thus allowing the person to see the conditions of the blind spot. In addition, the safety confirmation mirror can be configured not to reflect the conditions in the unnecessary direction on the reflective surface. Thus, the person looking at the safety confirmation mirror is not confused by an unnecessary image and can easily see the blind spot near the corner of the passage more clearly. This can surely prevent careless collision around the corner of the passage.

Moreover, the safety confirmation mirror of the present invention is primarily used to reflect a blind spot of a passageway in one direction and therefore can be installed at the position suitable to reflect the blind spot of the passage in the necessary one direction. This allows the reflective surface to reflect the conditions in a wider range in the necessary direction, thus enhancing the advantages to prevent careless collision around the corner of the passageway.

Herein, ii is preferable that the distance between the opposite-side edge of the reflective surface and the widthwise center of the Fresnel mirror be set to not more than 100 mm. This can easily allow the reflective surface to reflect a blind spot in the necessary direction while not reflecting an unnecessary image.

In the case of installing the safety confirmation mirror on a far end wall surface at a T-shaped or L-shaped intersection, the opposite-side edge of the reflective surface is located on a same side of the widthwise center of a passageway that ends at the far end wall surface as the direction that the reflective surface is offset in the Fresnel mirror and is located closer to the widthwise center of the passageway than the one-side edge of the reflective surface is.

In the case of installing the safety confirmation mirror on a wall surface of a passage which ends at a far end wall surface of the T-shaped intersection or on a wall surface of a passageway forming a cross intersection, the safety confirmation mirror is installed near a corner of the wall surface of the passage which ends at the far end wall surface of the T-shaped intersection or near a corner of the wall surface of the passageway forming the cross intersection so that the other side-edge of the reflective surface is located closer to the corner than the one-side edge of the reflective surface is.

If the opposite-side edge of the reflective surface is designed to coincide with the widthwise center of the Fresnel mirror, the manufacturing efficiency is increased. In other words, it is possible to obtain two reflective surfaces from one Fresnel mirror with no waste.

The safety confirmation mirror of the present invention may include a display portion provided in a front surface of the mirror, and configured to indicate the direction of the one-side edge of the reflective surface. This display portion draws the attention to the indicated direction, thus facilitating seeing of the conditions in the indicated direction. The display portion may include an arrow. In this case, with the displayed arrow, the person looking at the safety confirmation mirror 1 can know the direction of the one-side edge of the reflective surface at a glance and can see the conditions in the indicated direction more readily. Moreover, a display portion showing an alert may be displayed in the surface. This can alert the person looking at the safety confirmation mirror 1 to danger, thus further enhancing the safety.

MODES FOR CARRYING OUT THE INVENTION

Figure 1:
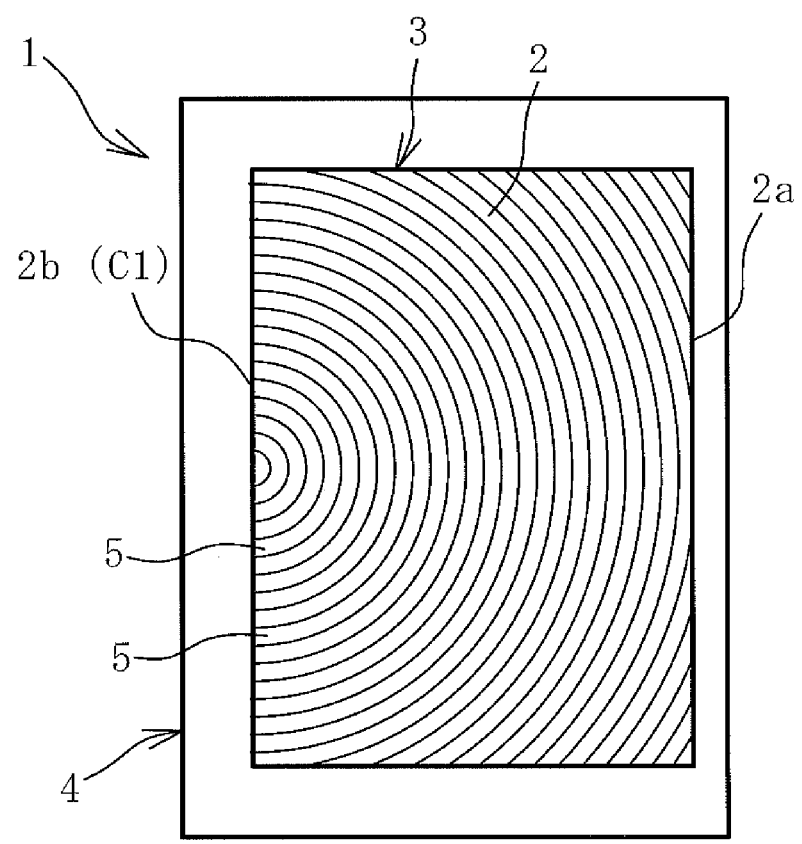
FIG. 1 is a front view illustrating a safety confirmation mirror of the present invention.

Hereinafter, a description is given of a safety confirmation mirror of the present invention based on the embodiments shown in the drawings.

Figure 2:
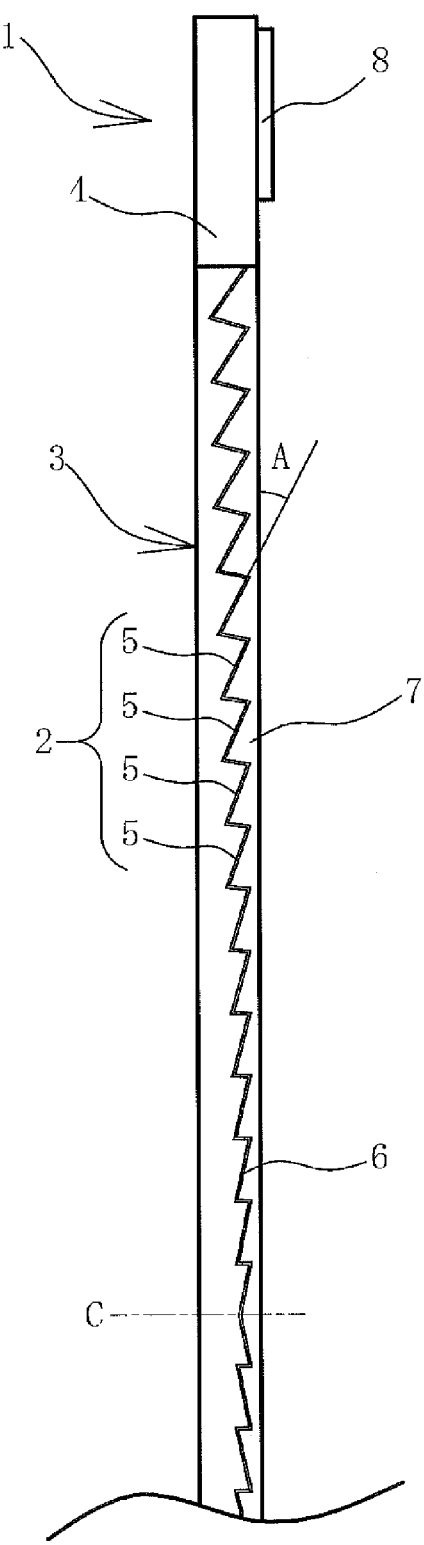
FIG. 2 is an enlarged cross-sectional view of a part of the safety confirmation mirror of FIG. 1.

As illustrated in FIGS. 1 and 2, a safety confirmation mirror 1 of the present invention includes, as a reflective surface 2, a portion of a Fresnel mirror 3 being offset to one side of a widthwise center C1 thereof. The reflective surface 2 is a surface reflecting an image.

The Fresnel mirror 3 includes a planar transparent plastic plate 4 with a large number of annular inclined grooves concentrically formed in the back surface, and a reflective film 6 laid on the inclined grooves 5. The transparent plastic plate 4 may be made of a different body from the body of the Fresnel mirror 3 to be fit and integrated with the body of the Fresnel mirror 3. Angle A of inclination of the inclined grooves 5 gradually increases as the distance of the inclined grooves 5 from the concentric center C in the radial direction increases. A protection layer 7 made of a coating material and the like is laid on the reflective film 6. On the back surface of the transparent plastic plate 4, a double-faced adhesive tape 8 is attached to fix the safe confirmation mirror 1 to a wall surface. The safety confirmation mirror 1 can be fixed to the wall surface by a screw or the like instead of or in addition to the double-faced adhesive tape 8.

The widthwise center C1 of the Fresnel mirror 3 is a line segment that passes through the centers of the annular inclined grooves 5 and accurately divides the single Fresnel mirror 3 into right and left equal halves. In this embodiment, the reflective surface 2 is a portion of the Fresnel mirror 3 being horizontally offset to the right of the widthwise center C1 of the Fresnel mirror 3. In this specification, an opposite-side edge 2b of the reflective surface 2 coincides with the widthwise center C1 of the Fresnel mirror 3.

Figure 3:
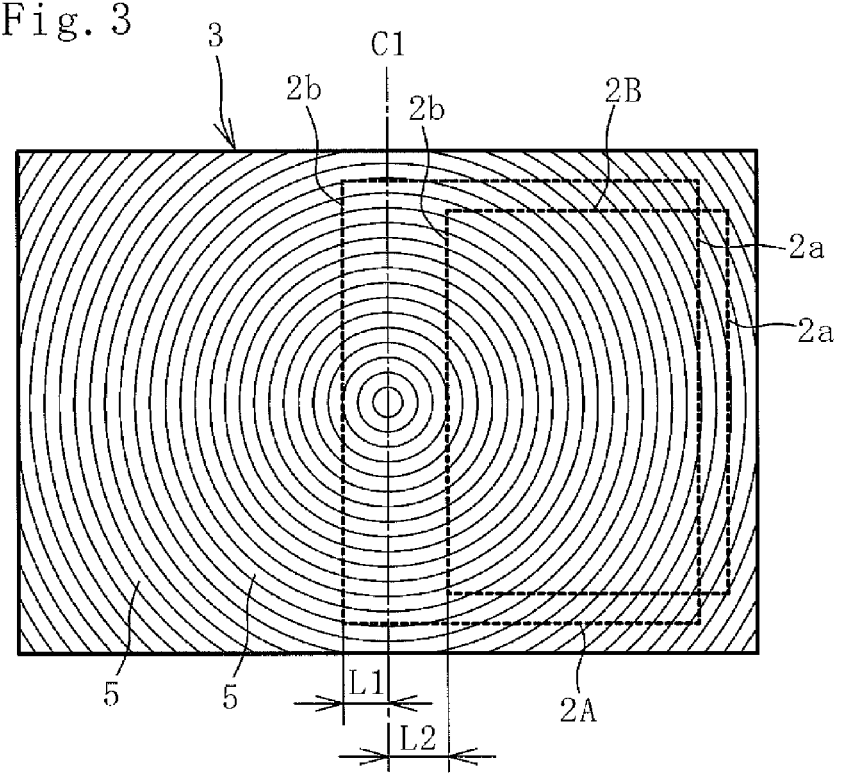
FIG. 3 is a plan view explaining a range of the reflective surface.

The reflective surface 2 is not limited to the portion illustrated in the embodiment of FIG. 1 and may be a range 2A or 2B surrounded by dotted lines in FIG. 3, for example. In the reflective surface 2A, the position of the opposite-side edge 2b is located on the opposite side of the widthwise center C1 to the direction that the reflective surface 2 is offset in the Fresnel mirror 3. In the reflective surface 2B, the position of the opposite-side edge 2b is located on the same side of the widthwise center C1 as the direction that the reflective surface 2 is offset in the Fresnel mirror 3. Lengths L1 and L2 between the opposite-side edges 2b of the reflective surfaces 2A and 2B and the widthwise center C1 are set to 100 mm or less, for example.

Figure 4:
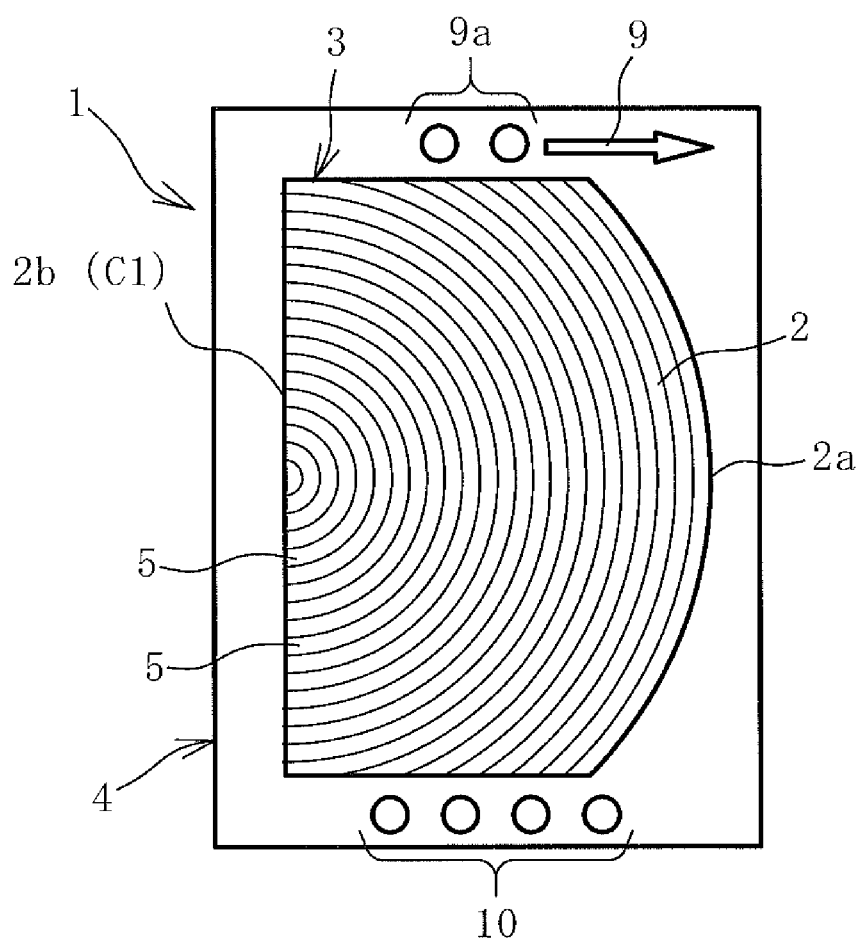
FIG. 4 is a front view illustrating another embodiment of the safety confirmation mirror.

FIG. 4 illustrates another embodiment of the safety confirmation mirror 1. This embodiment includes a display portion 9 in the surface, and the display portion 9 indicates the direction of a one-side edge 2a of the reflective surface 2. As the display portion 9, specifically, an arrow is displayed. In addition, the display portion 9 can include character display such as "RIGHT" when the direction of the one-side edge 2a of the reflective surface 2 is right and "LEFT" when the direction thereof is left.

In the front surface of the safety confirmation mirror 1, a specific display 9a indicating an object that exists in the direction that the reflective surface 2 is reflecting (the direction of the one-side edge 2a) may be provided. Examples of the specific display 9a include "TOILET", "CONFERENCE ROOM", "RECEPTION", "ELEVATOR", "STAIRWAY", and "FIRE EXTINGUISHER". This specific display 9a may be provided in addition to or instead of the display portion 9.

This embodiment further includes a display portion 10 in the surface, and the display portion 10 shows an alert. The display portion 10 can include character display such as "DANGER" or "CAUTION".

Figure 5:
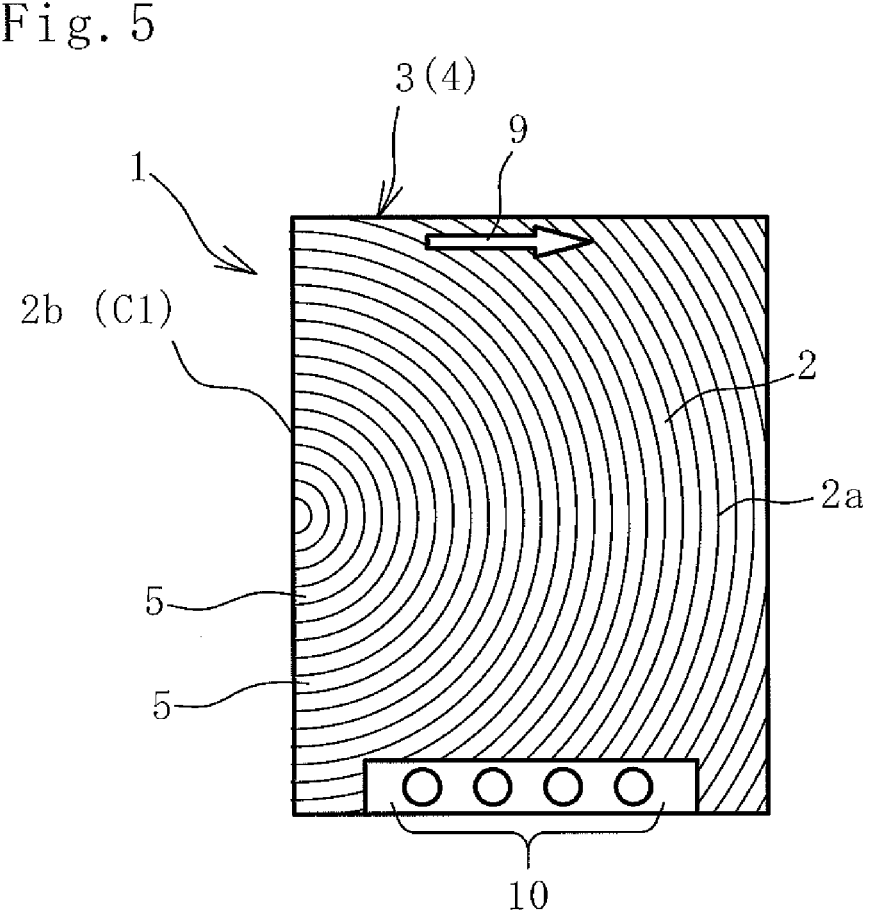
FIG. 5 is a front view illustrating still another embodiment of the safety confirmation mirror.

The entire range of the safety confirmation mirror 1 can be composed of the Fresnel mirror 3 like the embodiment illustrated in FIG. 5. In this case, the aforementioned display portions 9 and 10 and specific display 9a are provided by direct printing on the front surface of the Fresnel mirror 3 or the like.

Figure 6:
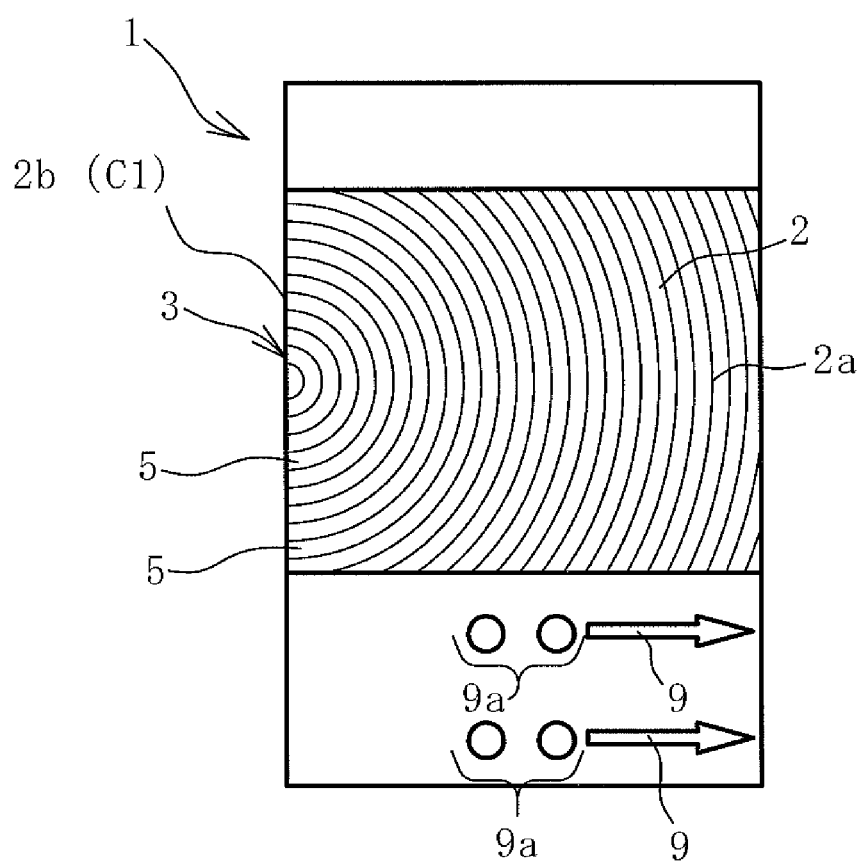
FIG. 6 is a front view illustrating still another embodiment of the safety confirmation mirror.

The Fresnel mirror 3 can be arranged as illustrated in FIG. 6. In this embodiment, the Fresnel mirror 3 is located at the vertically intermediate position in the safety confirmation mirror 1, and the both right and left edges directly coincide with the right and left edges of the safety confirmation mirror 1, respectively. Plastic plates provided above and below the Fresnel mirror 3 are properly colored. In this embodiment, the safety confirmation mirror 1 can be installed on a wall surface in a natural manner with the Fresnel mirror 3 being not conspicuous.

The thickness of the safety confirmation mirror 1 is about 2.0 to 5.0 mm, for example. The shape of the reflective surface 2 can be one selected from various shapes such as a rectangle like FIG. 1, an arcular shape with the one-side edge 2a protruded like FIG. 4, a triangle, a circle, an ellipse, and a trapezoid. In the case of the reflective surface 2 of a rectangular shape, the reflective surface 2 has a side length of about 100 to 500 mm. If the reflective surface 2 has another shape, the reflective surface 2 has a size equivalent to the area of the rectangular reflective surface 2.

The pitch of the inclination grooves 5 in the radial direction is for example, 0.1 to 0.5 mm and, preferably, about 0.2 to 0.4 mm. The transparent plastic plate 4 should be made of resin having excellent transparency such as polycarbonate (PC), acrylic (PMMA), polyvinyl chloride (PVC), or polyethylene terephthalate (PET). The reflective film 6 can be metal deposited film, metal plating film, or the like. The reflective film 6 has a thickness of about 10 to 200 nm, for example.

The place where the safety confirmation mirror 1 is installed is not particularly limited but is installed mostly on indoor wall surfaces. The safety confirmation mirror 1 can be installed in various places including hospitals, schools, and office buildings, for example.

Figure 7:
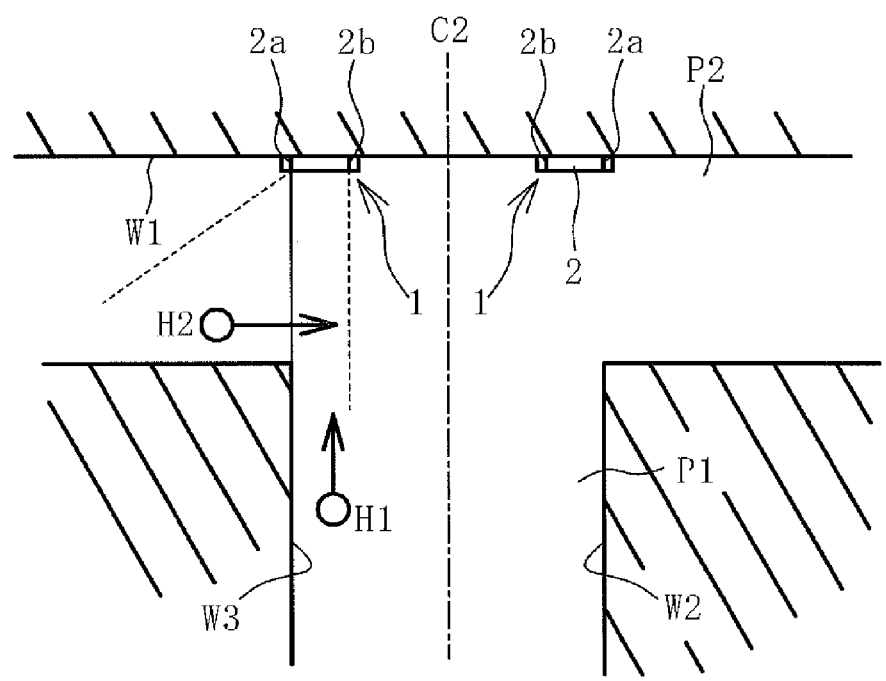
FIG. 7 is an explanatory view illustrating a state where the safety confirmation mirror is installed on a far end wall surface at a T-shaped intersection.

In the case of installing the safety confirmation mirror 1 on a far end wall surface W1 at a T-shaped intersection, as illustrated in FIG. 7, the opposite-side edge 2b of the reflective surface 2 is located on a same side of a widthwise center C2 of a passageway P1, which ends at the far end wall surface W1, as the direction that the reflective surface 2 is offset in the Fresnel mirror 3. Moreover, the opposite-side edge 2b of the reflective surface 2 is located closer to the widthwise center C2 of the passageway P1 than the one-side edge 2a is.

When a person H1 who is moving along the passageway P1 toward the far end wall surface W1 is going to turn left at the corner, this person H1 looks at the safety confirmation mirror 1 at the opposing position and thereby sees the conditions in the direction that the person H1 is going to turn. In other words, a person H2 who is moving straight along a passageway P2 from the left to right is reflected on the reflective surface 2 of the safety confirmation mirror 1, so that the person H1 is prevented from colliding with the person H2. This person H1 can look at the safety confirmation mirror 1 in a natural manner without being forced to change the direction of gaze.

The reflective surface 2 primarily reflects a blind spot in the direction of the one-side edge 2a, that is, in the direction that the person H1 is going to turn and little reflects the conditions in the direction that the person H1 is not going to turn. Accordingly, the person H1 is not confused by an unnecessary image and can easily see the blind spot near the corner of the passageway more clearly.

Figure 11:
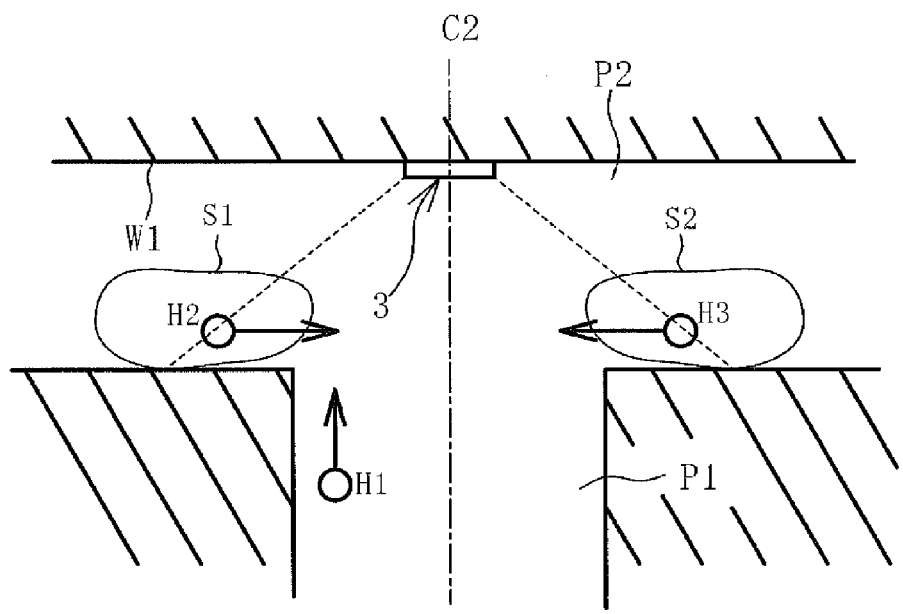
FIG. 11 is an explanatory view illustrating a state where one whole Fresnel mirror is installed on the far end wall surface at a T-shaped intersection.

This safety confirmation mirror 1 is primarily used to reflect a blind spot of a passageway in one direction. Accordingly, the safety confirmation mirror 1 can be installed at a position suitable to reflect the blind spot of the passageway in the necessary one direction. The safety confirmation mirror 1 can be therefore installed to the left of the Fresnel mirror 3 illustrated in FIG. 11, so that the reflective surface 2 reflects the conditions of a wider range in the necessary direction. The safety confirmation mirror 1 is therefore further advantageous to prevent careless collision around the corner of the passageway.

As shown in FIG. 3, when the length L1, L2 between the opposite-side edge 2b of the reflective surface 2 and the widthwise center C1 of the Fresnel mirror 3 is set not more than 100 mm, the reflective surface 2 is easily allowed to reflect a blind spot in the necessary direction while not reflecting an unnecessary image.

Moreover, the safety confirmation mirror 1 is preferably installed so that the reflective surface 2 is located on an extension of a surface wall W3 of the passageway P1. This can easily allow the reflective surface 2 to reflect the blind spot in the necessary direction on the reflective surface 2 while not reflecting an unnecessary image. In particular, it is preferable that the one-side edge 2a of the reflective surface 2 be aligned with the extension of the wall surface W3.

When the display portion 9 indicating the direction of the one-side edge 2a of the reflective surface 2 is provided on a front surface of the safety confirmation mirror 1 as illustrated in FIG. 4, the display portion 9 draws the attention of the person looking at the safety confirmation mirror 1 to the indicated direction, and therefore, the person can more easily see the conditions of the indicated direction. When the display portion 9 includes an arrow, the person looking at the display portion 9 can know the direction of the one-side edge 2a at a glance. Accordingly, the person looking at the display portion 9 can much more easily see the conditions in the necessary direction.

Moreover, when the display portion 10 showing an alert is provided on the front surface of the safety confirmation mirror 1, this display portion 10 can alert the person looking at the safety confirmation mirror 1 to danger, thus further enhancing the safety.

In the above description, the safety confirmation mirror 1 is installed to the left of the widthwise center C2 of the passageway P1. However, the safety confirmation mirror 1 can be installed to the right of the widthwise center C2 in the same manner.

Figure 8:
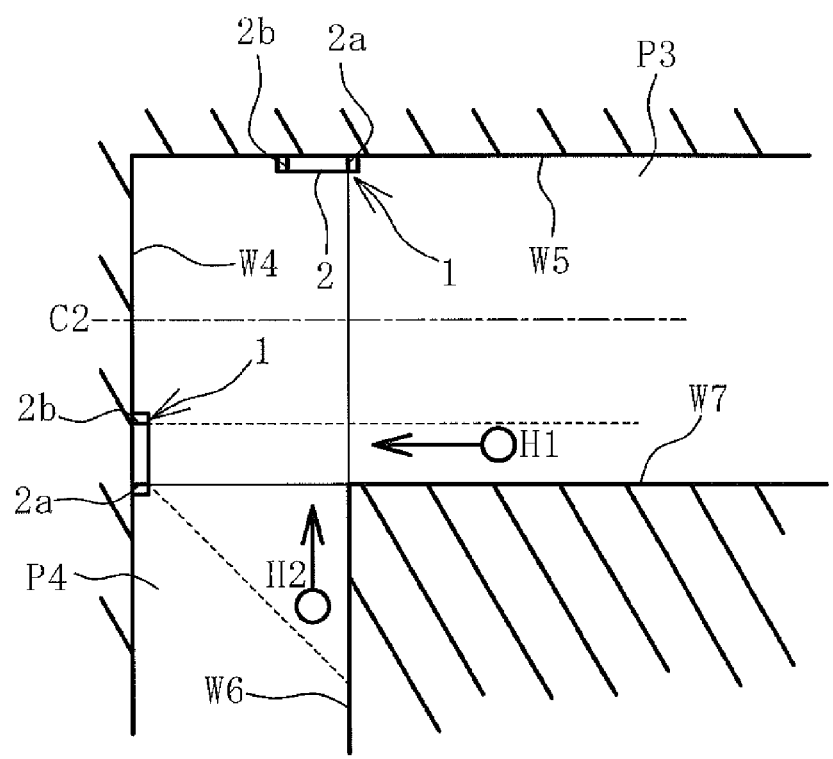
FIG. 8 is an explanatory view illustrating a state where the safety confirmation mirror is installed on an outside wall surface at an L-shaped intersection.

When the safety confirmation mirror 1 is installed on a far end wall surface W4 at an L-shaped intersection, as illustrated in FIG. 8, the opposite-side edge 2b of the reflective surface 2 is located on a same side of a widthwise center C2 of a passageway P3, which ends at the far end wall surface W4, as the direction that the reflective surface 2 is offset in the Fresnel mirror 3. In this case, the opposite-side edge 2b is located closer to the widthwise center C2 of the passageway P3 than the one-side edge 2a is.

Accordingly, the reflective surface 2 reflects only the blind spot in the direction of the one-side edge 2a, that is, in the direction that the person H1 is going to turn and little reflects the conditions in the direction that the person H1 is not going to turn. This prevents the person H1 from being confused by an unnecessary image, and allows the person H1 to easily see the blind spot near the corner of the passageway more clearly.

Moreover, in a similar manner to the case of FIG. 7, it is preferable that the safety confirmation mirror 1 be installed so that the reflective surface 2 is located on the extension of a surface wall W7 of the passageway P3. This can easily allow the reflective surface 2 to reflect the blind spot in the necessary direction while not reflecting an unnecessary image. In particular, it is preferable that the one-side edge 2a of the reflective surface 2 be aligned with the extension of the wall surface W7.

In the above description, the safety confirmation mirror 1 is installed on the far end wall surface W4. However, the safety confirmation mirror 1 can be installed on another far end wall surface W5 in a similar manner.

Figure 9:
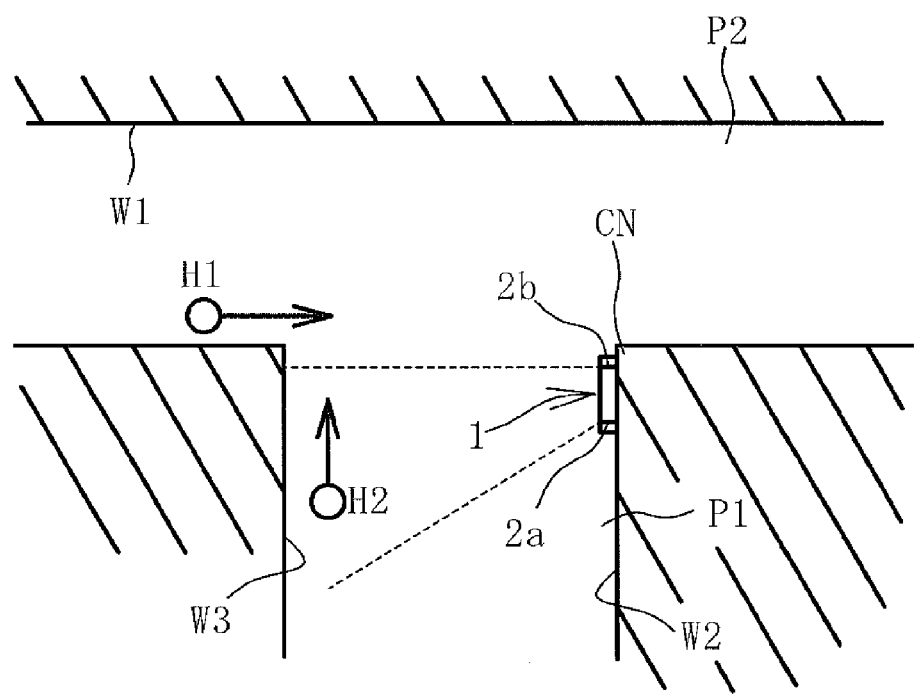
FIG. 9 is an explanatory view illustrating the safety confirmation mirror installed near a corner of a T-shaped intersection.

In the case of installing the safety confirmation mirror 1 on the wall surface W2 of the passageway P1, which ends at the far end wall surface W1 of the T-shaped intersection, as illustrated in FIG. 9, the safety confirmation mirror 1 is installed near a corner CN of the wall surface W2 of the passage way P1 so that the opposite-side edge 2b of the reflective surface 2 is located closer to the corner CN of the wall surface W2 than the one-side edge 2a is.

The reflective surface 2 therefore reflects only the direction of the one-side edge 2a, that is, the blind spot in the direction that the person H1 is going to turn while little reflecting the conditions in the direction that the person H1 is not going to turn. Accordingly, the person H1 is not confused by an unnecessary image and can easily see the blind spot near the corner of the passageway more clearly.

In the above description, the safety confirmation mirror 1 is installed on the wall surface W2. However, the safety confirmation mirror 1 can be installed on another wall surface W3 in the same manner.

Figure 10:
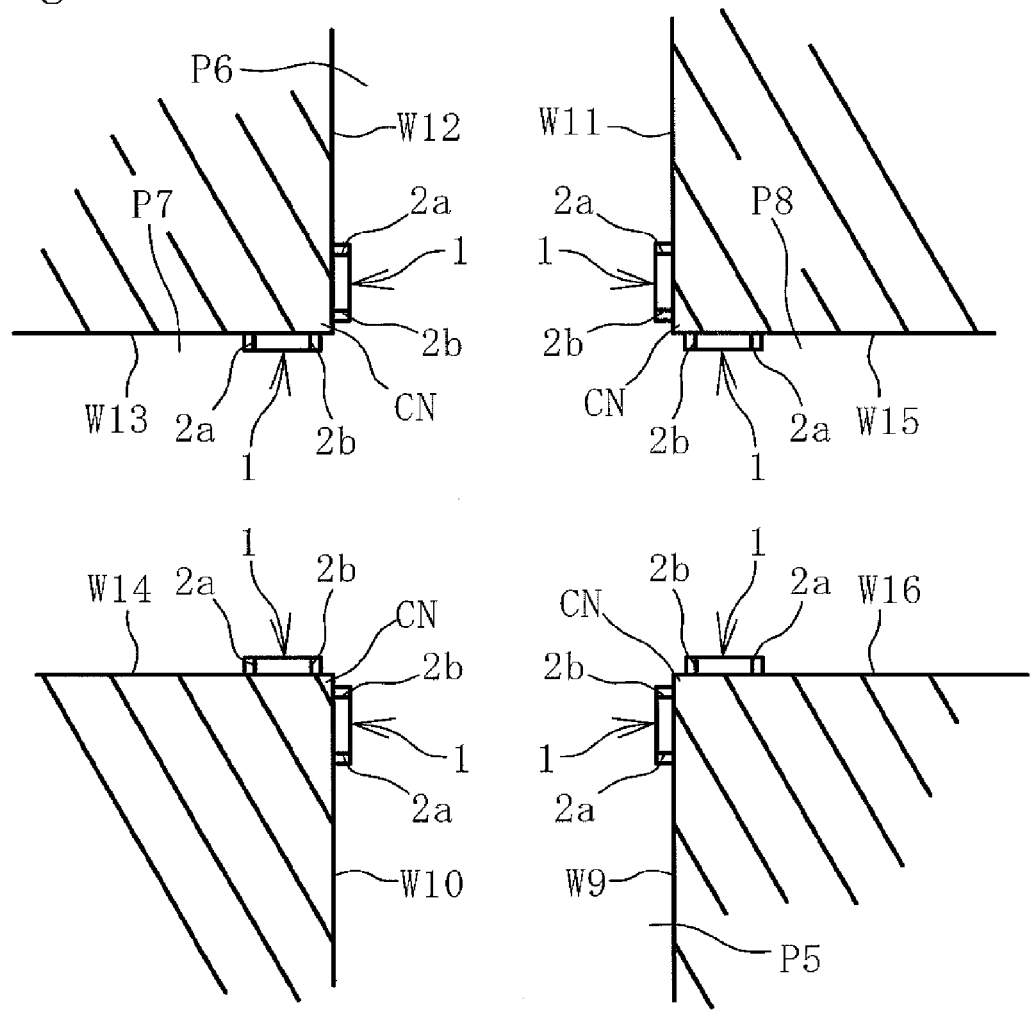
FIG. 10 is an explanatory view illustrating a state where the safety confirmation mirror is installed near each corner of a cross-intersection.

In the case of installing the safety confirmation mirror 1 on each of wall surfaces W9 to W16 of passageways P5 to P8, that forms a cross intersection, the safety confirmation mirror 1 can be installed in the same manner as the case of FIG. 9. Specifically, as illustrated in FIG. 10, the safety confirmation mirror 1 is installed near the corner CN of each of the wall surfaces W9 to W16 of the passageways P5 to L8, that forms the cross intersection, so that the opposite-side edge 2b of the reflective surface 2 is located closer to the corner CN of each wall surface W9 to W16 than the one-side edge 2a is.

EXPLANATION OF REFERENCE NUMERALS

1 SAFETY CONFIRMATION MIRROR
2, 2A, 2B REFLECTIVE SURFACE
2A ONE-SIDE EDGE
2B OPPOSITE-SIDE EDGE
3 FRESNEL MIRROR
4 TRANSPARENT PLASTIC PLATE
5 ANNULAR INCLINED GROOVE
6 REFLECTIVE FILM
7 PROTECTION FILM
8 DOUBLE-SIDED ADHESIVE TAPE
9 DISPLAY PORTION INDICATING DIRECTION OF ONE-SIDE EDGE
9A SPECIFIC DISPLAY
10 DISPLAY PORTION SHOWING ALERT
P1 to P8 PASSAGEWAY
W1 TO W16 WALL SURFACE
C1 WIDTHWISE CENTER OF FRESNEL MIRROR
C2 WIDTHWISE CENTER OF PASSAGEWAY

The invention claimed is:

1. An installation structure of a safety confirmation mirror at an indoor T-shaped intersection, in which a front end of a passageway is connected to a side of another passageway crossing the front of the passageway, which comprises:
   a pair of Fresnel mirrors which is installed on a wall surface of the side of the other passageway separately to each side of right and left in relation to the widthwise center of the passageway; wherein
   each of the pair of the Fresnel mirrors has a reflective surface in which a widthwise center of each concentric circle in the Fresnel mirrors is offset towards an opposite-side edge from one side edge;
   the distance between the opposite-side edge of the reflective surface and the widthwise center of the each of the Fresnel mirrors is not more than 100 mm; and
   the pair of the Fresnel mirrors are installed so that each of the opposite-side edges is opposite each other and located closer to the widthwise center of the passageway than to each of the one side edges.

2. The safety confirmation mirror system according to claim 1, wherein the opposite-side edges of the reflective surfaces coincide with the widthwise center of the Fresnel mirrors.

3. The safety confirmation mirror system according to claim 1, further comprising a display portion provided on a front surface of the Fresnel mirrors, and configured to indicate a direction of the one-side edges of the reflective surfaces.

4. The safety confirmation mirror system according to claim 3, wherein the display portions include an arrow.

5. The safety confirmation mirror system according to claim 1, further comprising a display portion provided on a front surface of the Fresnel mirrors, and configured to show an alert.

* * * * *